US006687042B2

(12) United States Patent
Chou et al.

(10) Patent No.: US 6,687,042 B2
(45) Date of Patent: Feb. 3, 2004

(54) GROUP-VELOCITY MISMATCH COMPENSATION FOR OPTICAL SIGNAL PROCESSING

(75) Inventors: Ming-Hsien Chou, Holmdel, NJ (US); Martin M. Fejer, Menlo Park, CA (US); Jonathan Kurz, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 169 days.

(21) Appl. No.: 09/940,700

(22) Filed: Aug. 27, 2001

(65) Prior Publication Data

US 2002/0131156 A1 Sep. 19, 2002

Related U.S. Application Data

(60) Provisional application No. 60/228,259, filed on Aug. 25, 2000.

(51) Int. Cl.[7] ............................. G02F 1/365; G02F 2/02
(52) U.S. Cl. ........................................ 359/332; 359/326
(58) Field of Search ................................. 359/326–332; 385/15, 27, 39, 122

(56) References Cited

U.S. PATENT DOCUMENTS

| 5,224,194 A | | 6/1993 | Islam | |
|---|---|---|---|---|
| 5,369,519 A | | 11/1994 | Islam | |
| 5,579,152 A | * | 11/1996 | Ellingson et al. | ............ 359/330 |
| 5,659,419 A | * | 8/1997 | Lokai et al. | ................. 359/330 |
| 5,663,973 A | * | 9/1997 | Stamm et al. | ................. 372/20 |
| 5,815,307 A | | 9/1998 | Arbore et al. | |
| 5,825,517 A | | 10/1998 | Antoniades et al. | |
| 5,867,304 A | | 2/1999 | Galvanauskas et al. | |

OTHER PUBLICATIONS

S.J.B. Yoo, "Wavelength Conversion Technologies for WDM Network Applications", Journal of Lightwave Technology, vol. 14, No. 6, Jun. 1996, pp. 955–966.

* cited by examiner

*Primary Examiner*—John D. Lee
(74) *Attorney, Agent, or Firm*—Lumen Intellectual Property Services, Inc.

(57) ABSTRACT

A compensated nonlinear optical frequency mixer for compensating the walk-off produced by group velocity mismatch (GVM) between interaction waves. The compensated mixer has a first mixing region in which the interaction waves participate in a non-linear optical mixing process and where walk-off occurs between the interaction waves due to GVM. The compensated mixer is equipped with a frequency selective coupling and time delay structure located after the first mixing region for eliminating the walk-off produced between the interaction waves in the first mixing region by guiding the waves in arms whose lengths differ by a re-synchronization length. A second mixing region is located after the frequency-selective coupling and time delay structure, such that when the waves emerge in phase from the frequency selective coupling and time delay structure they continue to interact efficiently in the second mixing region. The compensated nonlinear optical frequency mixer of the invention can by used to compensate for GVM in frequency mixing operations involving a material's $\chi^{(2)}$ susceptibility.

14 Claims, 3 Drawing Sheets

GROUP-VELOCITY MISMATCH COMPENSATION FOR OPTICAL SIGNAL PROCESSING

RELATED APPLICATIONS

This application claims priority from provisional patent application 60/228,259 filed on Aug. 25, 2000 which is herein incorporated by reference.

GOVERNMENT SPONSORSHIP

This invention was sponsored by DARPA under grant No. UNM MDA 972-98-1-0002. The government has certain rights in this invention.

FIELD OF THE INVENTION

The present invention relates generally to the processing of optical signals in nonlinear optical frequency mixers, and in particular to the alleviation of the group velocity mismatch (GVM) occurring between interaction waves in such mixers.

BACKGROUND OF THE INVENTION

Development of high capacity optical networks has accelerated because of emerging demand for world-wide communications. Information, interactive multimedia service, electronic commerce, and many other services are efficiently delivered online through the Internet. Optical fiber communication serves as the enabling technology to realize those Internet activities. Today, several tens of gigabits-per-second of data traffic are carried over many thousands of kilometers through optical fiber communication systems.

Transmission of high capacity data and, more importantly, the management of that high capacity data are the keys to the realization of such global optical-fiber-based networks. This rapid evolution in communication systems is creating enormous demands for optoelectronic components with capabilities beyond those currently available. In particular, the requirements push some theoretical limitations of transmission of optical signals.

Today's optical communication systems rely on wavelength division multiplexing (WDM) as well as time division multiplexing (TDM) techniques to send optical signals in the form of pulses through optical fiber. The pulses are designed with pulse widths as narrow as $3 \times 10^{-12}$ s and the trend to narrower pulses and higher rates continues. One of the main physical limits to our ability to reduce the pulse width even further is the basic phenomenon of pulse lengthening due to the dependence of its group velocity on frequency. This phenomenon, called group velocity dispersion (GVD), affects every mode of light, with the exception of solitons and is often defined by the relation:

$$D \equiv L^{-1}(dT/d\lambda),$$

where T is the pulse transmission time through length L of the fiber and $\lambda$ is the wavelength of the light. This definition is related to the second order derivative of the propagation constant $\beta(\omega)$ of the mode with respect to its angular frequency $\omega$ by:

$$D = -\frac{2\pi c}{\lambda^2}\left(\frac{d^2\beta}{d\omega^2}\right),$$

where c is the speed of light in vacuum. Meanwhile, group velocity $v_g$ is defined as:

$$\frac{1}{v_g} = \frac{d\beta}{d\omega}.$$

When a light pulse contains several wavelength components, GVD causes these to migrate within the pulse envelope producing a "chirp" and it also causes the pulse to broaden. In particular, the chirp causes the longer wavelengths to migrate to the front of the pulse envelope while the shorter wavelengths recede to the back. The effects of GVD are frequently expressed in terms of a group velocity mismatch (GVM) describing the rate at which pulses at different wavelengths slip off each other.

The prior art contains many teachings related to compensation of pulse broadening occurring when pulses travel through fiber by phase conjugation. In these schemes, a pulse travels a certain length of fiber and broadens while accumulating a chirp. A phase conjugator reverses the chirp of the pulse, typically by a nonlinear mixing operation relying on a nonlinear optical material exhibiting a third order susceptibility $\chi^{(3)}$. The chirp reversed pulse travels through another length of fiber and experiences recompression. The recompression occurs because the longer wavelengths flipped to the back of the pulse will move forward and the shorter wavelengths flipped to the front of the pulse will move to the back.

In addition to the use of nonlinear materials for phase conjugation based on $\chi^{(3)}$, nonlinear optical materials having a second order susceptibility $\chi^{(2)}$ are also used in optical frequency mixers to perform various mixing functions including second harmonic generation, difference frequency generation, sum frequency generation, parametric generation or parametric amplification. These functionalities can be used in an all-optical network at nodes for switching optical signals in different wavelength channels in different directions without ever converting the optical signals into electronic form. In addition, nonlinear optical mixers can be used to switch optical signals between different optical carrier wavelengths, either within the immediate network or when transferring to a neighboring network. Such wavelength switches can be used to build wavelength interchangers or wavelength interchanging cross-connects. More information about such switches can be found in S. J. B. Yoo, "Wavelength Conversion Technologies for WDM Network Applications", Journal of Lightwave Technology, Vol. 14, No. 6, June 1995, pp. 955–66 as well as U.S. Pat. No. 5,825,517 to Antoniades et al. and the references cited therein.

The effects of GVD on short pulses, and especially on ultra-short pulses on the order of picoseconds, interferes not only with the propagation of such pulses through fiber but also with efficient nonlinear wavelength mixing of such ultra-short pulses. U.S. Pat. No. 5,815,307 to Arbore et al. and U.S. Pat. No. 5,867,304 to Galvanauskas et al. teach the use of chirped gratings to take advantage of second order susceptibility $\chi^{(2)}$ of the nonlinear material to adjust the shape of pulses. For example, Arbore et al. teach how to compress pulses during second harmonic generation (SHG) by taking advantage of the principles of GVD and nonlinear optical frequency mixing. To achieve efficient frequency conversion these devices employ quasi-phase-matching (QPM) to counteract the phase slip between the generating or pumping light and the generated or converted light as these two interaction waves propagate through the nonlinear optical material. In contrast to GVD, the phase slip is due to the fact that optical signals of different wavelengths, e.g. the pumping wave and the frequency doubled wave experience a different index of refraction in the nonlinear optical material. Thus, there is a phase velocity mismatch between the interaction waves. The QPM grating is employed in the nonlinear material to prevent the phase slip occurring between the generating and generated light signals or interaction waves due to phase velocity mismatch. Thus, by keeping the interacting waves in phase, QPM ensures efficient frequency mixing between the interaction waves.

Unfortunately, the effects of GVD are felt in nonlinear mixing processes irrespective of the type of nonlinear mixing process and phase matching technique used. GVD effects are especially pronounced when the interaction waves are short pulses and have very different wavelengths. In those situations a substantial walk-off is produced between the interaction waves over very short distances and the nonlinear mixing process stops.

The prior art describes several systems and devices which contend with dispersion problems. For example, U.S. Pat. Nos. 5,369,519 and 5,224,194 to Islam teach the use of a nonlinear material with negligible walk-off to achieve all-optical timing restoration function in optical switching and transmission systems. The negligible walk-off is realized by a hybrid solution that consists of a nonlinear chirper followed by a dispersive line. The scheme can be characterized as a hybrid solution, which needs a delay line with a dispersion sign different from the nonlinear chirper. In U.S. Pat. No. 5,696,614 Ishikawa et al. provide an optical wavelength multiplex transmission method to realize an optical communication system of an increased capacity which is not influenced by crosstalk by four-wave mixing (FWM). This patent also describes a dispersion compensation method for the WDM transmission link. Unfortunately, none of these references teach compensation for group velocity mismatch (GVM) in nonlinear frequency conversion based on material second order susceptibility $\chi^{(2)}$.

In view of the above, it would be a significant advantage over the prior art, to provide nonlinear optical mixers which are compensated for GVM. Specifically, it would be an advance to compensate for GVM effects between short-pulsed signals over sufficiently long distances to increase the efficiency of nonlinear mixing using material $\chi^{(2)}$ susceptibility between the interaction waves and to enable high bit-rate time-sequential data streams as required, e.g., for TDM networks.

OBJECTS AND ADVANTAGES

In view of the above, it is a primary object of the present invention to provide a compensated nonlinear optical frequency mixer and a method to compensate nonlinear optical frequency mixers for the effects of GVM.

It is another object of the invention to provide for high conversion efficiencies of short pulsed interaction waves in nonlinear mixing processes relying on material $\chi^{(2)}$ susceptibility by compensating for walk-off between the interaction waves.

It is yet another object of the invention to provide for GVM induced walk-off compensating structures in nonlinear optical mixers which are easy to make and integrate into such mixers.

Still another object of the invention is to ensure that the GVM compensating structures and methods are compatible with most nonlinear mixing processes including second harmonic generation, difference frequency generation, sum frequency generation, parametric amplification, and parametric generation.

These and numerous other advantages of the present invention will become apparent upon reading the detailed description.

SUMMARY

The present invention provides a compensated nonlinear optical frequency mixer for compensating the walk-off produced by group velocity mismatch between a first interaction wave and a second interaction wave. The compensated mixer has a first mixing region in which the interaction waves participate in a non-linear optical mixing process. The walk-off occurs between the first and second interaction waves in this first mixing region because the interaction waves have different wavelengths and hence different group velocities. The compensated mixer is equipped with a frequency selective coupling and time delay structure located after the first mixing region for eliminating the walk-off produced between the interaction waves in the first mixing region. A second mixing region is located after the frequency-selective coupling and time delay structure, such that when the waves emerge in phase (no walk-off) from the frequency selective coupling and time delay structure they continue to interact efficiently in the second mixing region.

The frequency-selective coupling and time delay structure has a first directional coupler and a second directional coupler. In one embodiment a first arm for receiving the first interaction wave and a second arm for receiving the second interaction wave are positioned between the first and second directional couplers. The first arm is longer than the second arm by a re-synchronization length. The re-synchronization length is selected such that the first interaction wave and the second interaction wave are recombined in phase or very nearly in phase at the second directional coupler. In another embodiment, a phase-insensitive compensating arm for receiving the first interaction wave is positioned between the first and second directional couplers. In yet another embodiment, the frequency selective coupling and time delay structure is equipped with a tunable phase shifter.

The compensated nonlinear optical frequency mixer of the invention can perform any of the known frequency mixing operations. Specifically, the frequency mixer has a $\chi^{(2)}$ susceptibility in the first and second mixing regions. Therefore, the frequency mixer can support any nonlinear frequency conversion operation based on the $\chi^{(2)}$ susceptibility. For example, the mixer can support difference frequency generation, sum frequency generation, second harmonic generation, optical parametric generation and amplification.

The frequency mixer can take advantage of a quasi-phase-matching grating for phase matching the nonlinear frequency conversion. In fact, either the first or second mixing regions or both can be equipped with a quasi-phase-matching grating. The length of the first mixing region is such that the walk-off is less than 180 degrees out of phase. Depending on the total conversion efficiency desired, the number of mixing regions and interposed frequency-selective coupling and time delay structures can vary. Conveniently, the frequency mixer is designed such that the mixing regions and the frequency-selective coupling and time delay structure or structures are integrated in a single substrate.

The method of the invention is used for compensating the nonlinear optical frequency mixer for walk-off due to group velocity mismatch between first and second interacting waves. The method calls for providing the first mixing region where the walk-off between the interaction waves occurs and for providing a frequency-selective coupling and time delay structure after the first mixing region. The frequency-selective coupling and time delay structure is adjusted to eliminate the walk-off which occurred between the first and second interacting waves. A second mixing region is provided after the frequency-selective coupling and time delay structure. The adjusting of the frequency-selective coupling and time delay structure can include adjusting a propagation delay between the first and second interaction waves. Alternatively, the adjusting step can including adjusting a phase relationship between the first and second interaction waves. In any event, the adjustment is performed such that the first and second interaction waves emerge from the frequency-selective coupling and time delay structure in phase or very nearly in phase.

A detailed description of the invention and the preferred and alternative embodiments is presented below in reference to the attached drawing figures.

DETAILED DESCRIPTION

Figure 1:
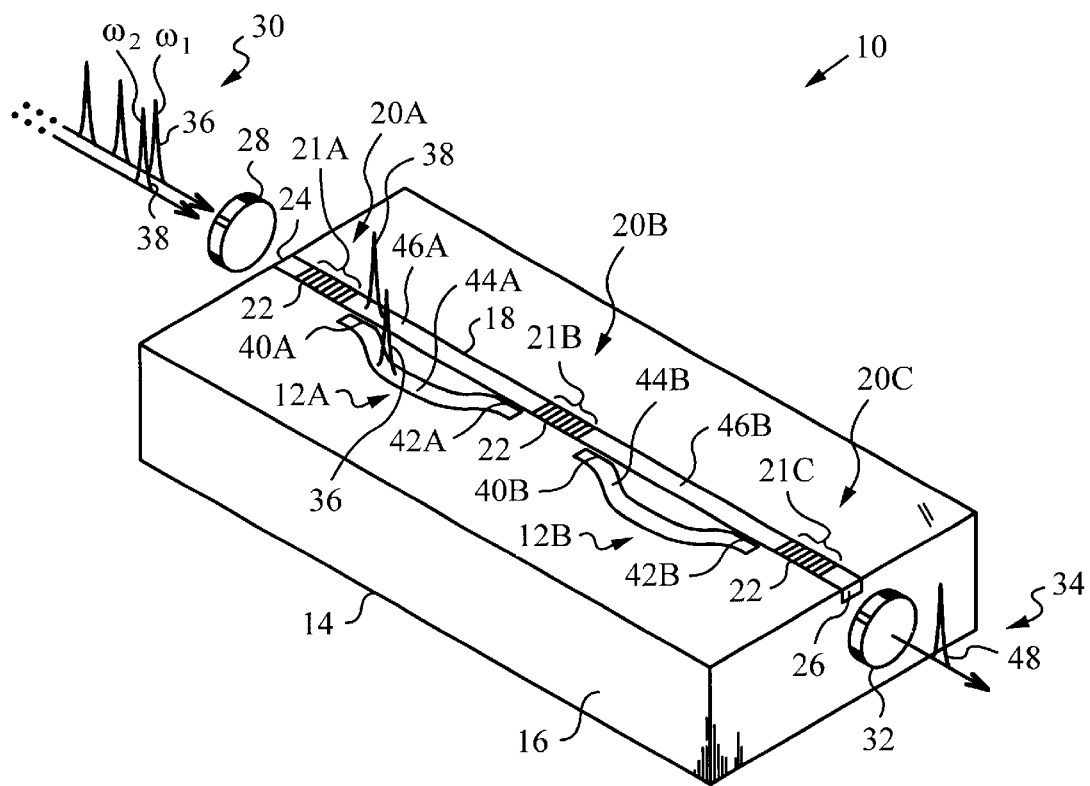
FIG. 1 is an isometric view of a nonlinear optical frequency mixer with a phase-sensitive group velocity mismatch (GVM) compensation structure in accordance with the invention.

A nonlinear optical frequency mixer 10 as shown in FIG. 1 is designed to compensate the effects of group velocity dispersion (GVD) which cause group velocity mismatch (GVM) between interaction light waves. Specifically, frequency mixer 10 has a GVM compensation structure 12 having two compensation sections 12A and 12B in accordance with the invention. Frequency mixer 10 is constructed in a substrate 14 which is conveniently made entirely of an optical material 16 exhibiting a $\chi^{(2)}$ susceptibility. For example, material 16 is lithium niobate, lithium tantalate, MgO:LiNbO$_3$, Zn:LiNbO$_3$, MgO:LiTaO$_3$, stoichiometric lithium niobate, stoichiometric lithium tantalate, potassium niobate, KTP, isomorphs of KTP such as KTA, RTA, RTP, as well as GaAs and other members of the III–V semiconductor as well as any organic nonlinear materials and nonlinear polymers. A person skilled in the art will realize that numerous other materials and groups of materials exhibiting suitably large nonlinear susceptibility $\chi^{(2)}$ and other advantageous material properties for optical frequency mixing are available and can be used as material 16.

Frequency mixer 10 has a waveguide 18 fabricated within material 16. The use of waveguide 18 in material 16 is preferred because it aids in guiding interaction waves and generally results in better conversion efficiencies during the nonlinear optical mixing operations as compared to bulk material. A series of three mixing regions 20A, 20B and 20C are provided in waveguide 18. In order to make the frequency mixing efficient phase-matching mechanisms in the form of three QPM gratings 21A, 21B and 21C are provided in the respective mixing regions 20A, 20B, 20C. QPM gratings 21A, 21B and 21C have domains or regions 22 defining a spatial distribution of the effective nonlinearity $d_{eff}$ of material 16. In defining this spatial distribution, regions 22 can be formed by appropriate growth of regions 22 to produce different non-linear orientations in adjacent regions 22. Alternatively, regions 22 can be obtained by poling in cases when material 16 is a ferroelectric material, a polymer or glass. A person skilled in the art will appreciate that there are numerous techniques which can be used to produce regions 22 as required for QPM gratings 21A, 21B and 21C depending on the type of material 16 selected. A person skilled in the art will also recognize that other types of phase-matching mechanisms can be provided instead of QPM gratings 21A, 21B and 21C to achieve efficient frequency mixing in mixing regions 20A, 20B and 20C. QPM gratings 21A, 21B and 21C distributed within waveguide 18 are designed to phase-match the nonlinear optical mixing operation or operations to be performed by frequency mixer 10. In some cases, waveguide 18 is fabricated within nonlinear optical material 16 after QPM gratings 21A, 21B and 21C. When nonlinear optical material 16 is LiNbO$_3$ or LiTaO$_3$ waveguide 18 may comprise waveguide structures that include, without limitation, annealed proton exchanged (APE) waveguides, buried waveguides, metal in-diffused waveguides (including metals such as zinc, titanium, etc.) as will be understood by those knowledgeable in the art.

Waveguide 18 has an input facet 24 and an output facet 26. In the present embodiment, input facet 24 and output facet 26 are located at opposing side walls of substrate 14. Input facet 24 has an associated in-coupling or coupling element 28, in this case a lens, for in-coupling input light 30 into waveguide 18. An out-coupling element 32 is provided past output facet 26 for guiding output light 34 exiting through output facet 26. A person skilled in the art will recognize that other coupling devices such as tapers in waveguide 18 can be employed in conjunction with or without a lens to serve the function of coupling elements 28 and 32. In general, coupling element 28 and coupling element 32 may include without limitation optical elements such as optical fiber, prism couplers, waveguide mode filters, waveguide couplers, and tapered waveguide regions. In particular, mode controlling structures for controlling the mode of light admitted into waveguide 18 can be used to maximize the overlap of interacting beams. As is known in the art, maximizing this overlap will ensure high efficiency of the frequency mixing operations performed by frequency mixer 10. A person skilled in the art will appreciate that the best choice of coupling element 28 is made by considering the wavelengths and modes of light 30 which are to be coupled into mixing regions 20A, 20B and 20C.

The two compensation sections 12A and 12B of GVM compensation structure 12 serve to compensate for the effect of walk-off produced by GVM. The GVM caused walk-off occurs between interaction waves participating in nonlinear optical frequency mixing operations in mixing regions 20A, 20B and 20C of frequency mixer 10. Compensation section 12A is positioned after first mixing region 20A for compensating the GVM walk-off which occurs in mixing region 20A. Compensation section 12B is positioned after second mixing region 20B for compensating the GVM walk-off which occurs in mixing region 20B. Mixing region 20C does not have a corresponding compensation section in this embodiment.

Each compensation section 12A, 12B is a frequency-selective coupling and time delay structure having a first directional coupler 40A, 40B and a second directional coupler 42A, 42B, respectively. Directional couplers 40A, 40B, 42A, 42B are frequency-selective, as further described below. In the present embodiment, all directional couplers 40A, 40B, 42A and 42B are junctions relying on evanescent field coupling. A person skilled in the art will recognize that other types of junctions including without limitation, Y-junctions and other directional coupling structures can also be employed.

Compensation section 12A has a first arm 44A for receiving a first interaction wave 36 and a second arm 46A for receiving a second interaction wave 38. Directional coupler 40A is frequency selective such that first interaction wave 36 is coupled into first arm 44A while second interaction wave 38 propagates through second arm 46A. Directional coupler 42A is frequency-selective such that it couples interaction wave 36 back into waveguide 18 at the point where arms 44A, 46A rejoin.

First arm 44A is longer than second arm 46A by a re-synchronization length. The re-synchronization length is selected such that first interaction wave 36 and second interaction wave 38 are recombined in phase or very nearly in phase at second directional coupler 42A.

Compensation section 12A is followed by second mixing region 20B where GVM walk-off between interaction waves 36, 38 takes place once again as the frequency mixing operation continues. Compensation section 12B is provided to compensate the GVM walk-off produced in mixing region 20B. For this purpose, section 12B has a first arm 44B and a second arm 46B for receiving interaction waves 36, 38 respectively. Once again, first arm 44B is longer than second arm 46B by a re-synchronization length selected to recombine interaction waves 36, 38 in phase or very nearly in phase at second directional coupler 42B. Frequency mixer 10 can be used to perform any of the known frequency mixing operations relying on the $\chi^{(2)}$ susceptibility of material 16. In the present embodiment, frequency mixer 10 is used for difference frequency generation between interaction waves 36, 38. Therefore, an output of the difference frequency mixing is an interaction wave 48 produced by nonlinear mixing of interaction waves 36, 38 at an angular frequency $\omega_{out}=\omega_1-\omega_2$ (the difference frequency). Of course, sum frequency generation, second harmonic generation, optical parametric generation and amplification can also be performed in frequency mixer 10. In fact, cascaded frequency mixing operations of the type $\chi^{(2)}:\chi^{(2)}$ can also be implemented.

The operation of frequency mixer 10 relies on first arms 44A, 44B being longer than second arms 46A, 46B by the correct re-synchronization lengths to compensate for GVM walk-off between interaction waves 36, 38 and 48. GVM walk-off between interaction waves 36, 38 and 48 is determined from their group velocities $v_g(\lambda_1)$, $v_g(\lambda_2)$ and $v_g(\lambda_1)$, which depend on their wavelengths $\lambda_1$, $\lambda_2$ and $\lambda_3$ respectively.

Group velocity $v_g$ is defined as:

$$\frac{1}{v_g} = \frac{d\beta}{d\omega},$$

where $\beta$ is the propagation constant and is a function of the angular velocity ($\beta=\beta(\omega)$). Thus, for any two interaction waves of wavelengths $\lambda_1$, $\lambda_2$ GVM can be defined as:

$$GVM = \frac{1}{v_g(\lambda_1)} - \frac{1}{v_g(\lambda_2)},$$

and is expressed in terms of time per distance. When performing difference frequency generation with interaction waves 36, 38 and 48 three different frequencies or wavelengths are involved. For example, these wavelengths can be 1550 nm, 770 nm and 1530 nm respectively. Interaction waves 36 and 48 having the long wavelengths will couple into longer first arm 44A while interaction wave 38 will propagate through shorter second arm 46A. GVM is compensated between interaction waves 36, 48 and interaction wave 38 and the re-synchronization length is determined for alleviating the GVM occurring between interaction waves 36, 48 and wave 38. A person skilled in the art will appreciate that the average wavelength difference between interaction waves 36, 38, 48 or 770 nm can be used to calculate the necessary re-synchronization length in this case.

After being recombined, interaction waves 36, 38 continue generating output wave 48 through difference frequency generation in mixing region 20B. Then, the GVM walk-off is again compensated in compensation section 12B, as previously done in compensation section 12A. After being compensated for the second time, interaction waves 36, 38, 48 are recombined at directional coupler 42B and enter mixing region 20C where they continue to generate output wave 48 through difference frequency generation. It is understood that more GVM compensation sections analogous to sections 12A, 12B can be provided between additional mixing regions to further improve the efficiency of frequency mixer 10.

In the case of performing second harmonic generation in frequency mixer 10 only two different wavelengths are involved, e.g., $\lambda_1=1560$ nm, $\lambda_2=780$ nm and the wavelength difference is 780 nm. In a specific implementation of frequency mixer 10, when waveguide 18 is an Annealed Proton Exchanged (APE) Lithium Niobate waveguide GVM is about 0.32 ps/mm. Thus, the maximum length of mixing regions 20A, 20B and 20C before requiring GVM walk-off compensation when interaction waves 36, 38 are formatted as 100 GHz signals (with 1/e pulse width of $\approx3$ picoseconds) is about 2 cm. After this distance the envelopes of interaction waves 36 and 38 will be 180 degrees out of phase.

In other words, for a 2 cm long first mixing region 20A the GVM walk-off to be compensated by compensation section 12A is 6.4 ps. Hence, the re-synchronization length by which first arm 44A is longer than second arm 46A provides 6.4 ps propagation time delay to interaction wave 36.

Preferably, the re-synchronization length is adjusted such that interaction waves 36, 38 are not only re-synchronized in their envelopes, but such that they preserve the correct phase relation between interaction waves 36, 38. In other words, interaction waves 36, 38 have to be recombined in phase or very nearly in phase. A person skilled in the art will appreciate that a waveguide diffusion model and dispersion curve of nonlinear waveguide material can be used to accurately determine the re-synchronization length.

Figure 2:
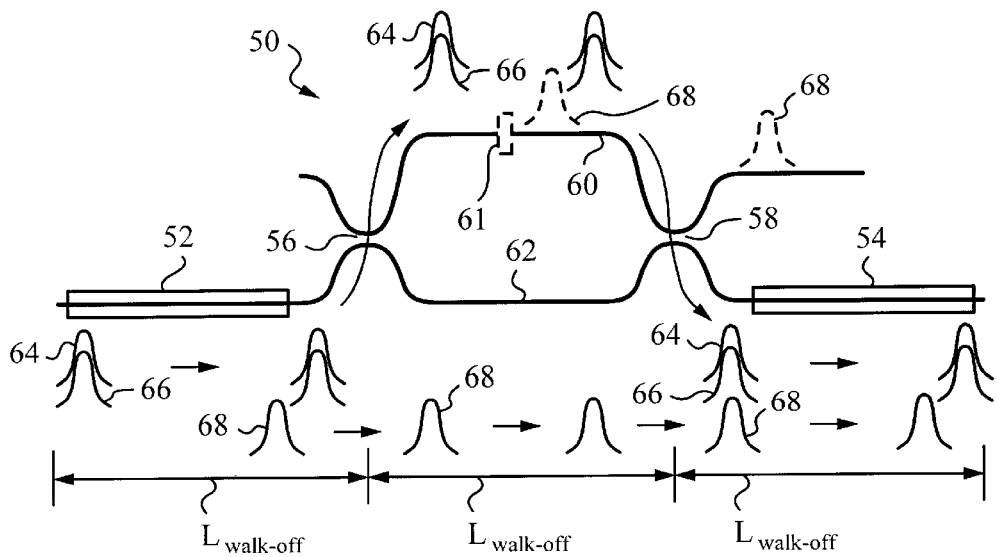
FIG. 2 is a diagram of a general GVM compensation structure in accordance with the invention.

Frequency mixer 10 of FIG. 1 is a preferred embodiment and of the invention employing phase-sensitive GVM compensation structure 12 made up of two compensation sections 12A, 12B. A more generalized phase-sensitive GVM compensation structure 50 is illustrated in FIG. 2. Compensation structure 50 is positioned between two mixing regions 52, 54. Mixing regions 52, 54 exist in a nonlinear optical medium exhibiting a $\chi^{(2)}$ susceptibility. Thus, any type of frequency mixing operation utilizing $\chi^{(2)}$ susceptibility can be performed in mixing regions 52, 54.

Compensation structure 50 has a first frequency-selective directional coupler 56 and a second frequency-selective directional coupler 58. A first arm 60 and a second arm 62 are positioned between directional couplers 56, 58. Directional coupler 56 is designed to couple longer wavelength signals into first arm 60 and directional coupler 58 is designed to couple longer wavelength signals into second mixing region 54. Second arm 62 is longer than first arm 60 by a re-synchronization length calculated to compensate for GVM walk-off between interaction waves 64, 66 over a walk-off length, $L_{walk-off}$. Walk-off length, $L_{walk-off}$ is defined as the length over which interaction waves 64, 66 slip off by at most 180 degrees.

Interaction waves 64, 66 are ultra-short pulse signals on the order of several picoseconds. These signals can be clock signals or information signals such as TDM signals. In the present example, interaction waves 64, 66 share the same wavelength $\lambda_1 = 1560$ nm and they drive the generation of a second harmonic interaction wave 68 at half their wavelength or at $\lambda_2 = 780$ nm via the $\chi^{(2)}$ susceptibility of the medium in mixing regions 52, 54. Interaction wave 64 is a clock signal which is synchronized to interaction wave 66. For example, the clock signal can be used to pick out interaction wave 66 which is a TDM signal from a stream of TDM signals (not shown). In this case, interaction wave 68 is an output signal at half the wavelength of TDM signal and corresponds to the de-multiplexed TDM signal.

During operation, both interaction waves 64, 66 enter first mixing region 52 and start generating interaction wave 68. Because interaction wave 68 has a shorter wavelength it will fall behind and slip off interacting waves 64, 66 by 180 degrees over one walk-off length. At this point directional coupler 56 will couple the longer wavelength interaction waves 64, 66 into first arm 60 and pass interaction wave 68 into second arm 62. Since first arm 60 is longer than second arm 62 by the re-synchronization length, waves 64, 66 will take longer to travel through first arm 60. After another walk-off length interaction wave 68 will have caught up with interaction waves 64, 66 and they will all be recombined in phase, or very nearly in phase, by directional coupler 58 and sent on to second mixing region 54.

In the event any portion of interaction wave 68 is coupled into first arm 60 or generated by second harmonic generation in first arm 60, that portion of interaction wave 68, indicated in a dashed line, will be discarded in a blind portion of directional coupler 58. Thus, only synchronized interaction waves 64, 66 and 68 enter second mixing region 54 to continue efficient second harmonic generation of interaction wave 68. Since GVM compensation structure 50 is phase-sensitive it requires not only to synchronize the envelopes of interaction waves 64, 66, and 68 but also to adjust the path accurately to preserve the correct phase relation among interacting waves 64, 66, 68.

By using GVM compensation structure 50 in a larger device with a number N of mixing regions (i.e., the length of the device is $NL_{walk-off}$), the efficiency scales approximately with $N^2/2$ for the second harmonic generation process and $N^4/4$ for cascaded $\chi^{(2)}:\chi^{(2)}$ mixing, as compared to $N^2$ and $N^4$ in the case of the same interaction length but without GVM compensation structure 50.

Figure 3:
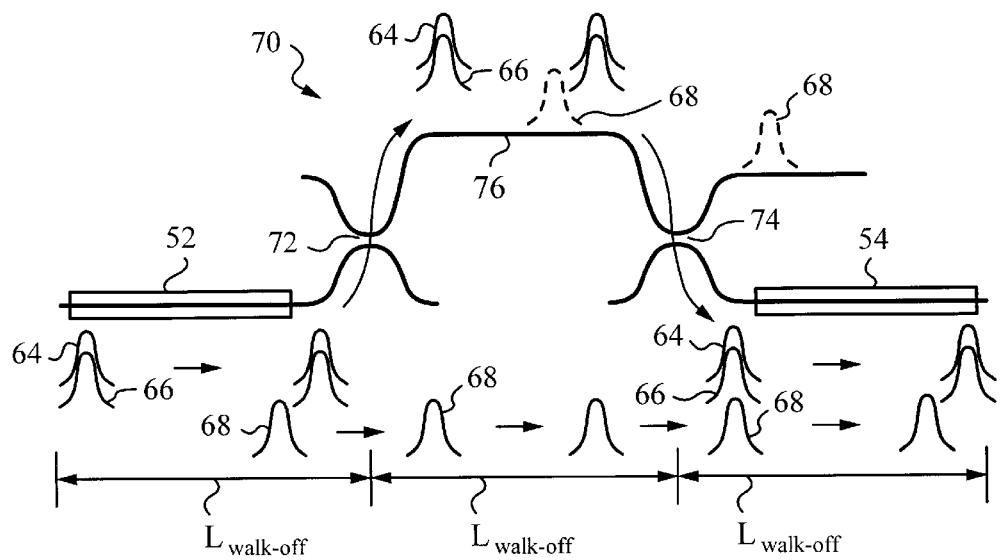
FIG. 3 is a diagram of a phase insensitive GVM compensation structure.

A person skilled in the art will recognize that the embodiments of FIG. 1 and FIG. 2 can be used for second harmonic generation, difference frequency generation and cascaded difference frequency generation. FIG. 3 shows another GVM compensation structure 70, which is phase insensitive and can be used for second harmonic generation and cascaded difference frequency generation. GVM compensation structure 70 is also positioned between mixing regions 52, 54 and acts on the same interaction waves 64, 66 and 68. Compensation structure 70 has a first frequency-selective directional coupler 72 designed to couple longer wavelength signals into a phase-insensitive compensating arm 76. A second frequency-selective directional coupler 74 is designed to couple longer wavelength signals into second mixing region 54.

The operation of compensation structure 70 is analogous to the operation of compensation structure 50, with the exception that interaction wave 68 is blocked. There is no second arm through which interaction wave 68 at the shorter wavelength can propagate. Hence, second harmonic generation restarts at each mixing region after the long wavelength interaction waves 64, 66 are coupled through directional coupler 74.

Using compensation structure 70 has the advantage that it does not require re-synchronization and interferometric stability on recombining. However, the efficiency of devices using compensation structure 70 scales only linearly with the number of mixing regions N.

A person skilled in the art will recognize that the embodiments described are generic to compensate GVM based on the material's second order susceptibility $\chi^{(2)}$ and are in general independent of the nonlinear mixing operation performed. In other words, they are not limited to implementation for difference frequency generation or second harmonic generation and can be adapted for sum frequency generation, optical parametric generation or optical parametric amplification.

In yet another embodiment, the frequency selective coupling and time delay structures in either FIG. 1 or FIG. 2 are equipped with a tunable phase shifter. FIG. 2 indicates in dashed line a tunable phase shifter 61 positioned in long arm 60. For example, phase shifter 61 is an electro-optic modulator. Phase shifters and their operation are well-known. Phase shifter 61 is used to ensure proper phase adjustment upon recombining interaction waves 64, 66 and 68.

A related class of devices which can employ any of the GVM structures of the invention are ultra fast Optical Parametric Generation (OPG) and Optical Parametric Amplification (OPA) devices. In these devices, a short wavelength pump pulse generates long wavelength output pulse. It is often desirable to keep the output pulse width (in time) as short as the pump pulse. In this case, the interaction length between the two pulses must be kept short to avoid pulse broadening due to GVM. This short interaction length limits the efficiency and reduces the output power of the device. Employment of GVM compensation structures in accordance with the invention produces higher efficiencies while maintaining short output pulse widths. In fact, by using GVM compensation structures between stages, efficient OPG-OPA devices that cascade the generation and amplification stages can be produced.

Figure 4:
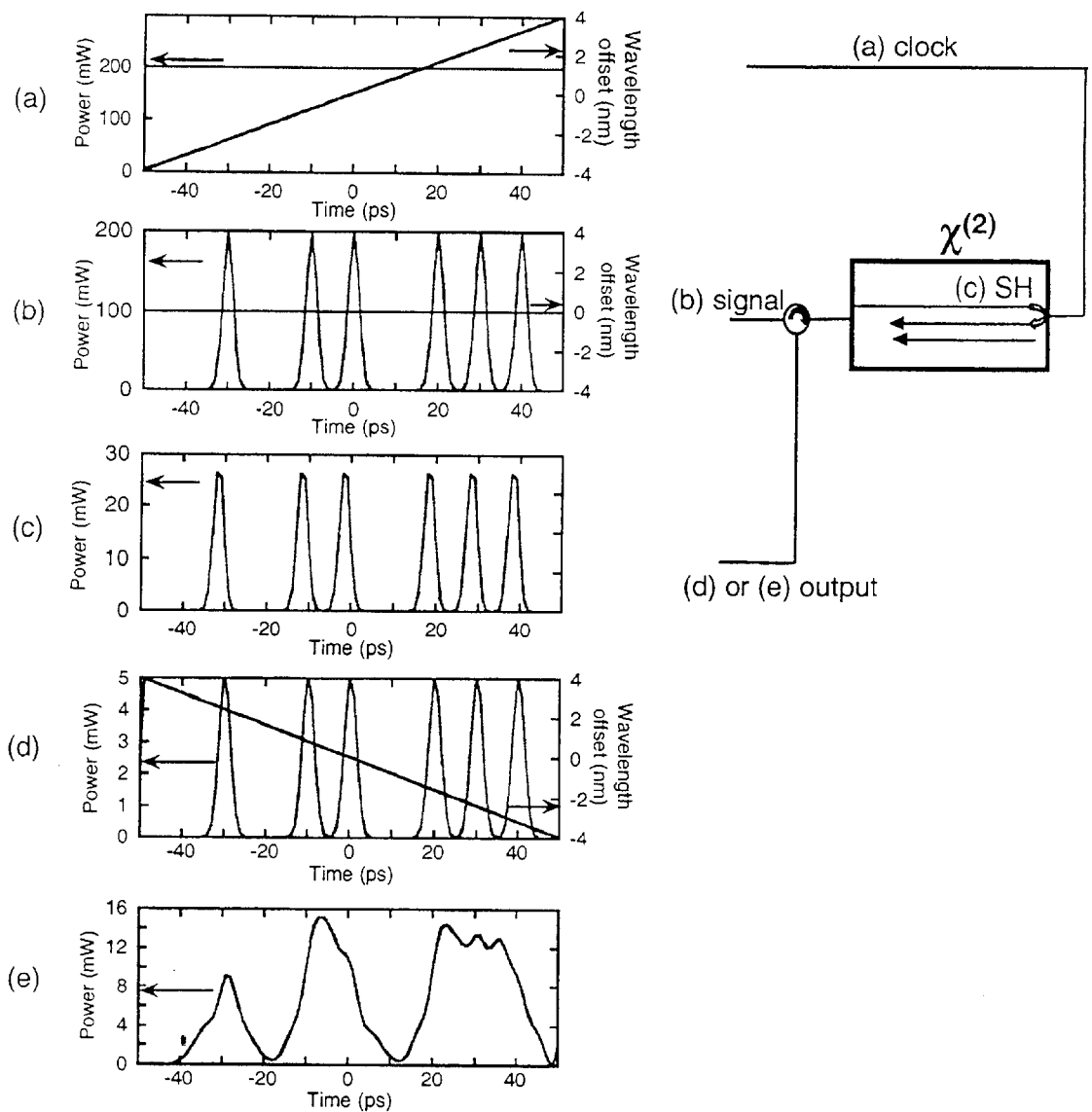
FIGS. 4(a)–4(e) show graphs for simulated results of multiple-channel demultiplexing with a chirped clock and the effects of GVM for shorter and longer mixing regions (samples).

As an example for where GVM compensation structure can find practical use, we show simulation results of optical frequency mixers in PPLN waveguides for applications as multiple-channel demultiplexers and TDM/WDM converters. The device consists of a uniform QPM grating, and is assumed to have a normalized efficiency of 150%/W-cm$^2$ and no waveguide propagation losses. The GVM between 780 nm and 1550 nm is 0.32 ps/mm. A 10 GHz linearly chirped super continuum square pulse is used as a clock. A 100 GHz TDM signal train ( . . . 0111011010 . . . ) is mixed with this chirped clock. It is assumed that both the optical signal and optical clock are amplified to a peak power level of 200 mW. The signal and clock pulses have Gaussian profiles with 1/e pulse width of 3 picoseconds, and are counter-propagating into the device. In such a mixing process, the TDM signals are first converted into second harmonic (SH) waves and then reflected back into the waveguide to interact with the chirped clock. The SH wave of each TDM channel interacts with a different part of the chirped clock and thus is converted to a different output wavelength. FIG. 4 shows the simulation results of such a conversion process based on coupled-mode equations. FIG. 4 specifically indicates in (a) the input linearly chirped square clock, (b) input 100-GHz TDM signal, (c) converted SH wave of input 100 GHz TDM signal after the first single pass using a device with 1 cm interaction length. (d) converted output using a device with 1 cm interaction length, (e) converted output using a device with 5 cm interaction length showing effect of GVM.

A person skilled in the art will recognize that numerous other embodiments and modifications to the embodiments described above are possible. Accordingly, the scope of the invention should be determined by the following claims and their legal equivalents.

What is claimed is:

1. A compensated nonlinear optical frequency mixer for compensating a walk-off due to group velocity mismatch between a first interaction wave and a second interaction wave, said compensated mixer comprising:
   a) a first mixing region in which said walk-off occurs between said first interaction wave and said second interaction wave;
   b) a frequency-selective coupling and time delay structure located after said first mixing region for eliminating said walk-off between said first interaction wave and said second interaction wave; and
   c) a second mixing region located after said frequency-selective coupling and time delay structure.

2. The compensated nonlinear optical frequency mixer of claim 1, wherein said frequency-selective coupling and time delay structure comprises a first directional coupler and a second directional coupler.

3. The compensated nonlinear optical frequency mixer of claim 2, wherein said frequency-selective coupling and time delay structure between said first directional coupler and said second directional coupler comprises a first arm for receiving said first interaction wave and a second arm for receiving said second interaction wave.

4. The compensated nonlinear optical frequency mixer of claim 3, wherein said first arm is longer than said second arm by a re-synchronization length.

5. The compensated nonlinear optical frequency mixer of claim 4, wherein said re-synchronization length is selected such that said first interaction wave and said second interaction wave are recombined substantially in phase at said second directional coupler.

6. The compensated nonlinear optical frequency mixer of claim 2, wherein said frequency-selective coupling and time delay structure comprises between said first directional coupler and said second directional coupler a phase-insensitive compensating arm for receiving said first interaction wave.

7. The compensated nonlinear optical frequency mixer of claim 1, wherein said frequency-selective coupling and time delay structure comprises a tunable phase shifter.

8. The compensated nonlinear optical frequency mixer of claim 1, wherein said compensated nonlinear optical frequency mixer has a $\chi^{(2)}$ susceptibility in said first mixing region and in said second mixing region.

9. The compensated nonlinear optical frequency mixer of claim 1, further comprising a quasi-phase-matching grating in at least one of said first mixing region and said second mixing region.

10. The compensated nonlinear optical frequency mixer of claim 1, wherein said first mixing region has a predetermined length such that said walk-off is less than 180 degrees out of phase.

11. The compensated nonlinear optical frequency mixer of claim 1, wherein said first mixing region, said frequency-selective coupling and time delay structure, and said second mixing region are integrated in a single substrate.

12. A method for compensating a nonlinear optical frequency mixer for a walk-off due to group velocity mismatch between a first interaction wave and a second interaction wave, said method comprising:
   a) providing a first mixing region in which said walk-off occurs between said first interaction wave and said second interaction wave;
   b) providing a frequency-selective coupling and time delay structure after said first mixing region;
   c) adjusting said frequency-selective coupling structure to eliminate said walk-off between said first interaction wave and said second interaction wave; and
   d) providing a second mixing region after said frequency-selective coupling and time delay structure.

13. The method of claim 12, wherein said step of adjusting said frequency-selective coupling and time delay structure comprises adjusting a propagation delay between said first interaction wave and said second interaction wave.

14. The method of claim 12, wherein said step of adjusting said frequency-selective coupling and time delay structure comprises adjusting a phase relationship between said first interaction wave and said second interaction wave.

* * * * *